(12) United States Patent
Sanchez et al.

(10) Patent No.: US 11,499,851 B2
(45) Date of Patent: Nov. 15, 2022

(54) SENSOR FUSION AS A SERVICE

(71) Applicant: Cisco Technology, Inc., San Jose, CA (US)

(72) Inventors: Marcelo Yannuzzi Sanchez, Canton de Fribourg (CH); Carlos M. Pignataro, Cary, NC (US); Hervé Muyal, Gland (CH); Simon Dyke, Hampshire (GB)

(73) Assignee: CISCO TECHNOLOGY, INC., San Jose, CA (US)

(*) Notice: Subject to any disclaimer, the term of this patent is extended or adjusted under 35 U.S.C. 154(b) by 16 days.

(21) Appl. No.: 16/991,680

(22) Filed: Aug. 12, 2020

(65) Prior Publication Data

US 2021/0239498 A1 Aug. 5, 2021

Related U.S. Application Data

(60) Provisional application No. 62/964,725, filed on Jan. 23, 2020.

(51) Int. Cl.
*G01D 21/02* (2006.01)
*G06F 9/54* (2006.01)

(52) U.S. Cl.
CPC ............ *G01D 21/02* (2013.01); *G06F 9/547* (2013.01)

(58) Field of Classification Search
CPC .. H04N 21/435; H04N 5/3415; G06N 3/0454; G06N 5/02; G05B 11/32; G05B 2219/37516; G06K 9/6292; G06F 16/258; G06F 9/547; G05D 1/0088; H04Q 9/00; H03H 9/6426; H04R 1/42; H04R 25/40; H04R 2201/40; G01D 21/02
See application file for complete search history.

(56) References Cited

U.S. PATENT DOCUMENTS

| | | | | |
|---|---|---|---|---|
| 5,626,140 A * | 5/1997 | Feldman | ............... | G06K 9/6293 600/483 |
| 5,850,625 A * | 12/1998 | Maren | ...................... | G01S 13/86 702/93 |
| 6,801,878 B1 * | 10/2004 | Hintz | ....................... | H04L 41/00 700/89 |
| 2003/0149803 A1 * | 8/2003 | Wilson | ................... | G06F 3/0346 710/1 |
| 2006/0082490 A1 | 4/2006 | Chen et al. | | |

(Continued)

OTHER PUBLICATIONS

Khaleghi et al., "Multisensor data fusion: A review of the state-of-the-art," Information Fusion 14, 2013, pp. 28-44.

*Primary Examiner* — Daniel R Miller
*Assistant Examiner* — Eric Sebastian Von Wald
(74) *Attorney, Agent, or Firm* — Polsinelli (57) ABSTRACT

Methods and systems for sensor fusion as a service include receiving a sensor fusion intent descriptive of desired data from a specified environment; determining candidate sensors present in the specified environment that may be used to obtain at least a portion of the desired data; and transforming the sensor fusion intent into a sensor fusion manifest by selecting a plurality of the candidate sensors to obtain respective output data, and by defining at least one action to fuse the respective output data into the desired data, wherein the sensor fusion manifest includes an identification of the selected candidate sensors and the at least one action to fuse the respective output data from the selected candidate sensors into the desired data.

16 Claims, 7 Drawing Sheets

(56) References Cited

U.S. PATENT DOCUMENTS

| | | | |
|---|---|---|---|
| 2014/0012401 A1* | 1/2014 | Perek | G06F 1/1618 |
| | | | 700/57 |
| 2015/0127300 A1* | 5/2015 | Bluming | G06F 3/017 |
| | | | 702/189 |
| 2016/0299959 A1 | 10/2016 | Sankar et al. | |
| 2019/0049986 A1* | 2/2019 | Georges | G01M 11/081 |
| 2019/0138268 A1 | 5/2019 | Andersen et al. | |
| 2019/0273909 A1* | 9/2019 | Ye | G01B 11/14 |
| 2019/0306011 A1* | 10/2019 | Fenoglio | G06N 3/0427 |

* cited by examiner

SENSOR FUSION AS A SERVICE

CROSS-REFERENCE TO RELATED APPLICATIONS

This application claims priority to U.S. Provisional Patent Application No. 62/964,725, filed on Jan. 23, 2020, entitled "Sensor Fusion as a Managed Service," the content of which is incorporated herein by reference in its entirety.

TECHNICAL FIELD

The subject matter of this disclosure relates in general to the field of sensor fusion; and more specifically pertains to a system that can receive an intent based input to determine appropriate sensors to utilize in combination to fulfill the intent.

BACKGROUND

Sensor devices are becoming ubiquitous. For example, in the context of manufacturing, energy production, construction, transport, security, enterprises, or various other environments, data may be collected from different machines, devices, and systems. Such data can relate to different workflows, parameters, and metrics which may be used to achieve design, development, deployment, and operation of related technologies. Different types of sensors can be used for collecting and forwarding the data to one or more locations where the data may be stored and analyzed to effect desired improvements.

In many instances data from several sensors are relevant to a particular objective, and often the data can be combined (fused) to achieve more detailed data from which more advanced conclusions can be reach or actions can be taken.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Disclosed herein are systems and methods relating to the field of sensor fusion, and more specifically relating to domain specific and technology agnostic sensor fusion deployable as a service.

A method can include receiving a sensor fusion intent descriptive of desired data from a specified environment. The method can also include determining candidate sensors present in the specified environment that may be used to obtain at least a portion of the desired data. Further, the method can include transforming the sensor fusion intent into a sensor fusion manifest by selecting a plurality of the candidate sensors to obtain respective output data, and by defining at least one action to fuse the respective output data into the desired data, wherein the sensor fusion manifest includes an identification of the selected candidate sensors and the at least one action to fuse the respective output data from the selected candidate sensors into the desired data.

In some embodiments, the determining the candidate sensors present in the specified environment can include identifying candidate sensors from a registry of smart objects that identifies the candidate sensors and their associated functions, the smart objects being digital replicas of the candidate sensors in the specified environment.

In some embodiments, the sensor fusion algorithms available for fusing data can be cataloged in a sensor fusion tool store storing a plurality of algorithms available to fuse data received from a combination of sensors, wherein the defining at least one action to fuse the respective output data into the desired data comprises determining at least one algorithm to fuse the respective output data into the desired data from the sensor fusion tool store.

In some embodiments, the sensor fusion intent can include a spatial requirement, a temporal requirement, a spatiotemporal requirement, or a domain type.

In some embodiments, the method can include sending the sensor fusion manifest to be carried out on a remote computing system.

In some embodiments, the method can include, after receiving the sensor fusion intent, analyzing the sensor fusion intent using semantic mapping, ontologies, or natural language processing to extract information used to identify the candidate sensors from the registry of smart objects.

In some embodiments, the method can include, after receiving the sensor fusion intent, analyzing the sensor fusion intent using semantic mapping, ontologies, or natural language processing to extract information used to identify at least one algorithm from a sensor fusion tool store storing a plurality of algorithms available to fuse data received from a combination of sensors.

In some embodiments, the manifest can further include spatial, temporal, or spatial temporal relationships between where and when the output data is to be retrieved and fused.

In some embodiments, the method can further include performing a closed loop adjustment of the sensors associated with the smart objects based on analyzing the deployed sensor fusion.

In some embodiments, the smart objects can include an application programmable interface (API) for receiving requests for data from the remote computing system.

A system can include a smart object registry storing a definition of a plurality of smart objects, the smart objects being digital replicas of a plurality of sensors in a particular environment, the definition of the smart objects including data available from a sensor and/or a method inherent to the sensor. The system can also include a sensor fusion tool store storing a plurality of algorithms available to fuse data received from a combination of sensors. The system can further include at least one processor configured to receive a sensor fusion intent descriptive of desired data from a specified environment; determine candidate sensors present in the specified environment that may be used to obtain at least a portion of the desired data; and transform the sensor fusion intent into a sensor fusion manifest by selecting a plurality of the candidate sensors to obtain respective output data, and by defining at least one action to fuse the respective output data into the desired data, wherein the sensor fusion manifest includes an identification of the selected candidate sensors and the at least one action to fuse the respective output data from the selected candidate sensors into the desired data.

DESCRIPTION OF EXAMPLE EMBODIMENTS

Disclosed herein are systems and methods for providing sensor fusion. More specifically, the disclosed technology addresses the need in the art for sensor fusion as a service, wherein a defined intent can be interpreted and realized by a sensor fusion system and deployed as a sensor fusion process.

Sensor fusion involves combining data streams which include different measurements or information collected by various sensors. Imagine a simple scenario involved in triangulating the position of a mobile device using two cell towers. Each cell tower will receive and send data to the mobile phone and will know the direction that the signals are being sent and received. However, each cell tower on its own will only be able to estimate with certainty an imaginary line on which the mobile device is located, and not an exact location. By fusing the data from each cell tower, a sensor fusion process can determine where those lines intersect, and thus determine a far better estimation of the mobile device's location than would have been possible with each cell tower's data on its own.

The example described above is simple, as it uses the minimum number of sensors (two) and both sensors are of the same type. One can imagine that this problem quickly grows in complexity as the raw number of sensors increases and the types of sensors increases. An added dimension involves what kind of algorithm to use to fuse the data. At its simplest, data could be fused using summation or multiplication. In the example above, the data would be fused using angulation or multilateration methods, taking into account the distance between the cell towers and the angles of the cellular signals relative to the imaginary line between the cell towers or time of arrival measurements. At more advanced levels, specialized algorithms like Kalman filtering (also known as linear quadratic estimation), neural networks, or other methods from statistics, control theory, or other branches of engineering and mathematics can be used.

In current scenarios, domain experts can use their specialized knowledge of a given context to manually set up a sensor fusion process. For example, specialized expertise in the sensors involved in air traffic control, robotics navigation such as self-driving cars, or docking a ship in a port (as elaborated below) would normally lead a domain expert to craft a specialized solution using given sensors available and knowledge of the appropriate algorithms for the context.

The present disclosure includes systems and methods for providing sensor fusion as a service. Specifically, this means taking an intent from a domain expert, such as "what is the location of this mobile device" and determining the available and appropriate sensors and algorithms to fulfill the intent. There are no known approaches in the art for automating the process of sensor fusion for a particular environment or intent in a technology agnostic manner.

In this disclosure, the techniques described rely heavily on using smart objects in sensor fusion. A smart object is a virtual representation or digital replica of a physical object, in this case, a virtual representation of a sensor in a specified environment. These smart objects can include all properties of the physical object, including operational status, sensor type, location, network, and other relevant information. Smart objects can also include an interface, such as an application programming interface (API) which allows discovery and management of the smart objects.

The present disclosure will be described in more detail as follows. The disclosure begins with a discussion of sensor fusion in the context of an example scenario for determining the force on a bollard line for berthing a ship. The disclosure will proceed to discuss a more general sensor-fusion-as-a-service system which transforms defined intents into deployable sensor fusion manifests, including a discussion of the role and function of smart objects. Before that, the disclosure will clarify the use of certain terminology.

In this disclosure, the term "sensor" can refer to endpoints of a network. For example, sensors can be connected to a network such as the Internet, cellular networks, wired electric power supply, etc. Some sensors can include "Internet of Things" devices (or "IoT" devices). In some embodiments, a sensor can include any object or device that has an addressable interface (e.g., an Internet protocol (IP) address, a Bluetooth identifier (ID), a near-field communication (NFC) ID, etc.) and can transmit information to one or more other devices over a wired or wireless connection. A sensor, for example, can have a passive communication interface, such as a quick response (QR) code, a radio-frequency identification (RFID) tag, an NFC tag, or the like, or an active communication interface, such as a modem, a transceiver, a transmitter-receiver, or the like. In some embodiments, sensors can have a particular set of attributes (e.g., a device state or status, such as whether the sensor is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to the network In some embodiments, a network can support communications among a plurality of sensors and other endpoint devices. For example, a mobile phone, video sensor, microphone or audio sensor, radar, drone, thermal sensor, etc., can include types of sensors or devices which may be present in the geographic area in which sensor fusion techniques can be deployed. These sensors can communicate over any wired or wireless interface with one another or with an access point (e.g., over a heterogeneous access network). In various examples, the communication can be over a wired network or air interface, including, for example, a local area network (LAN), a wide area network (WAN) such as a low-power wide-area network (LPWAN) or LoRa (Long Range), etc. In some embodiments, the heterogeneous access network can support communication standards such as Long Term Evolution (LTE), 5G, WiFi, wireless Internet protocol (IP), IEEE 802.11, etc.

The disclosure now turns to an example of determining a force on a bollard line for berthing a ship. The example makes clear the advantages of fused data over non-fused data, and the advantages of sensor fusion as a service to provide a technology agnostic sensor fusion manifest for deployment and consumption by an external system.

Figure 1:
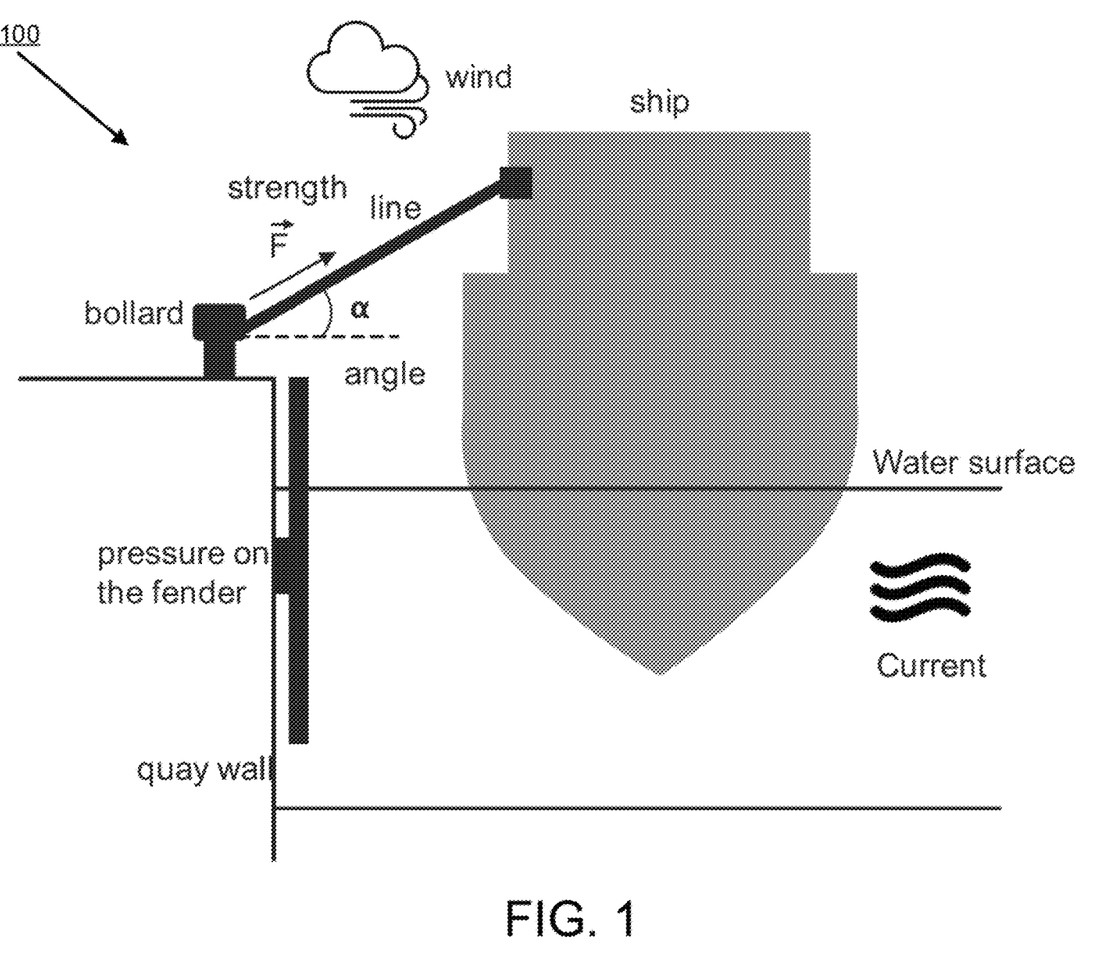
FIG. 1 illustrates a schematic view of an environment including sensors associated with berthing a ship, in accordance with some embodiments of the present technology.

FIG. 1 illustrates a schematic diagram of an environment 100 related to the berthing of a ship. Various systems may be in place to guide the ship into a port. In some embodiments, the ship can be an autonomous vessel or include autonomous navigation capabilities. For example, various systems on the ship can communicate with sensors which can assist in guiding the ship into a port and safely berthing the ship.

The ship in FIG. 1 is depicted in a position where it is fully or partially berthed. When berthed, the ship may come into contact with a quay wall which includes a fender. Pressure on the fender can be measured by one or more pressure sensors. The pressure sensors can measure the pressure on the quay wall when a portion of the ship may come in contact with the quay wall through the fender. The water surface may have several currents which can be measured by respective sensors. The wind direction and force around the ship may be measured by respective sensors. A bollard attached to the quay wall may have a line attached, which can support a certain strength or force applied by the ship, subject to various other forces such as the pressure on the quay wall, the current, wind, etc. Although a single bollard is shown and described in more detail, in typical deployments, several such bollards may be provided to support a large vessel being safely berthed.

Measuring the force on the line attached to each bollard is an important consideration because the force exceeding the maximum strength or capacity of a line can lead to severe consequences if the line is damaged or broken, potentially causing hazardous conditions to the port, the ship, or other elements in the environment 100. Monitoring the force on the line can be accomplished in many ways, and studying a combination of factors can lead to improved accuracy. For example, fusing the data obtained from the various current sensors, wind sensors, pressure sensors, sensors in the bollard, angle of the line, torsion, among others can provide a real-time analysis of the force being applied on the line. For example, the analysis can reveal whether the force on the line is within the maximum tolerable strength, and can lead to generation of warnings/corrective measures if there is a risk of exceeding this maximum.

In some embodiments, sensor fusion techniques can be used in the analysis to develop a model to estimate the force on the line. The model can take into account different currents, pressure on the fender, wind, dimensions (e.g., weight and height) of the ship, and the model can be continually updated as more information is gathered from the sensors. The model can generate possible scenarios which may pose risks to the integrity of the line. For example, specific maximum tolerance values for the various aspects of pressure on the fender, current, wind, dimensions, etc., (either individually or in various combinations) can be predicted, which can be used to improve the safety and efficiency of the berthing process.

Accordingly, an objective of sensor fusion in environment 100 can include a combination of multiple discrete measurements of the angle, the force of the wind, currents, etc., where such measurements may have variations caused by noise or other factors in the field/real world scenarios. While the various sensors may be present, in the native state of the environment 100, there may not be existing mechanisms for combining data obtained from different sensors automatically; rather this may be a manual process, e.g., for studying the different environmental factors such as the pressure, wind, currents, etc., and developing solutions like Kalman filter-based predictions for the force on the line, for example. In some embodiments, the sensor fusion techniques for combining the different measurements can improve the quality of estimation models, leading to improved measurements of the force and the resistance of the line. In some embodiments where one or more sensors on the bollard can measure the force on the line directly, the fused information from the other sensors can be used for improving these measurements and also for generating predictions on how the variations in other factors can cause the force on the line to change.

In some embodiments, each sensor or a group of sensors can be associated with a smart object. A smart object, can be a digital replica of the respective sensor or sensor group. This digital replica is effectively a virtual representation of the physical sensor or sensor group. The smart object can contain all relevant information about the physical sensor, including its location, measurements it receives, its capabilities, or other possible information.

For example, the bollard and the line can be understood as physical entities which do not have direct connectivity to external monitoring systems. The sensors which are attached or bound to these physical entities can measure the force on the line, its angle, etc., and provide this information to an external system. A smart object can be instantiated for a sensor using the information captured by the sensor. The smart object can be a software instantiation, modeled as an edge device on a network. The smart object can be managed locally or remotely (e.g., in a local computing infrastructure such as a data center or in a cloud computing system). For example, the smart object can collect the force information obtained from the sensor measuring force on the bollard and create a digital replica of the sensor. The smart object can obtain static information such as a bollard number or identifier of a specific bollard, the location (e.g., global positioning system (GPS)) of the bollard, an association of the bollard to a port or terminal, etc. The smart object can also collect and model real time or dynamic information such as a time series related to force measurements, and other operational data such as battery power of the sensor, signal strength used by the sensor for communication, etc.

In some embodiments, the static information and the dynamic information captured by a smart object can be based on the objective or domain specific intent (e.g., measuring the force of the line for berthing a ship, in this instance). The smart object can capture or gather the information including the static and dynamic information and provide an application programmable interface (API) or other interface for interacting with the smart object. The APIs provided by the smart objects can be used in developing a schema or a data model for fusing information from the underlying sensors associated with the smart objects. For example, the capabilities of a sensor and the type of information that a sensor can provide can be inferred or determined from the API of a smart object. In some embodiments, the smart object can be constructed as an autonomous self-contained entity that can provide the information about an underlying sensor and also assist with collecting information from the sensor and fusing the information for a particular objective.

For example, considering another objective of the sensor fusion as being measuring the angle alpha of the bollard, a camera or video sensor on the quay wall or bollard can provide information to its smart object replica, which can be used in measuring the angle alpha of the line relative to the sea level, for instance. This angle can be fused with information about the wind, information about the currents, the pressure on the fender, the real time measurements of the force on the line, etc., where the fusion can be managed through the use of smart objects for the various measurements. In some embodiments, the smart objects can be used to model a central platform which can enable sensor fusion in a technology or domain agnostic manner. In some embodiments, the static information may not be necessary for fusion, whereas the dynamic information may be used by the platform, even though the smart objects may collect both types of information.

The disclosure now turns from the example described in FIG. 1 to a description of systems and methods for implementing sensor fusion as a service.

Figure 2:
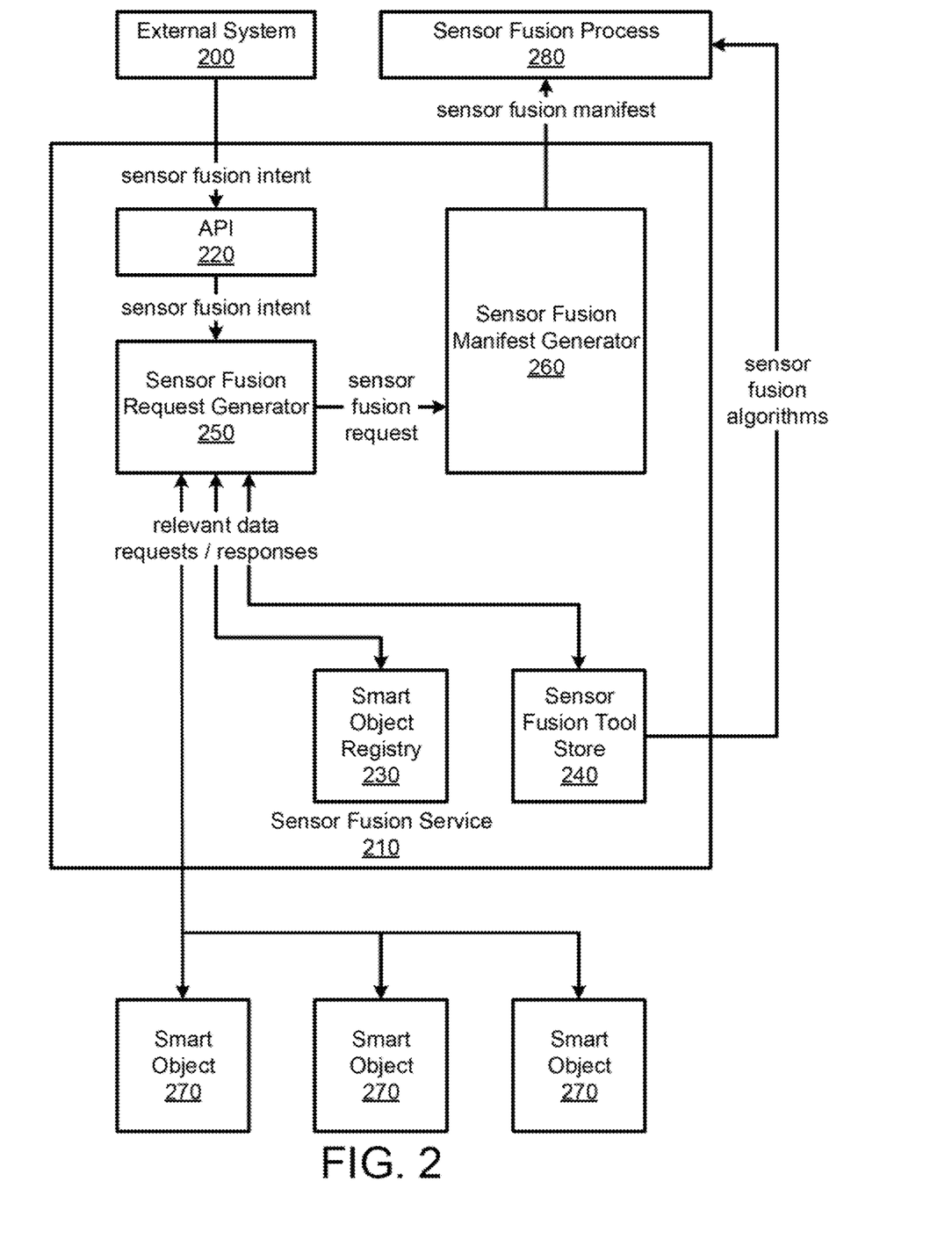
FIG. 2 illustrates a system diagram of a platform for sensor fusion, in accordance with some embodiments of the present technology.

FIG. 2 illustrates a system diagram of a platform for sensor fusion, in accordance with some embodiments. Sensor fusion service 210 can be used for sensor fusion of the various sensors shown in environment 100, for instance. Sensor fusion service 210 can receive a sensor fusion intent from external system 200 specifying desired data from a specific environment and return a sensor fusion manifest to sensor fusion process 280, which is involved in deploying the sensor fusion manifest. In transforming the sensor fusion intent into the sensor fusion manifest, sensor fusion service 210 determines which smart objects 270 corresponding to candidate sensors in the specified environment may be used to obtain portions of the desired data from smart object registry 230, and also identifies an appropriate action, such as an algorithm or tool, from sensor fusion tool store 240 for use in the sensor fusion manifest.

External system 200 can send a sensor fusion intent to sensor fusion service 210, which is received by API 220. External system 200 can send the sensor fusion intent via a domain expert with specific knowledge of the situation at hand, for example the berthing of a ship, or can be an automated system generating sensor fusion intents. External system 200 can ultimately consume the fused data generated by the sensor fusion manifest, or the fused data can be consumed by another entity.

The sensor fusion intent can include a specific intent including an objective and any spatial and temporal requirements and constraints associated with the environment 100. For example, the intent can include an objective such as determining the force on the line, subject to wind and currents. In some embodiments, external system 200 can further define metrics such as the sensors to be used in the fusion (e.g., two camera with specific pan, tilt, and zoom for measuring the angle, and other operational parameters), while in other examples, such constraints may be relaxed while allowing sensor fusion service 210 to determine the optimal sensors to be used. The sensor fusion intent can be packaged in a text-based data structure, such as an XML file or JSON object.

In some embodiments, external system 200 can run analytics to discover which smart objects 270 are available for environment 100. This information may be domain/context specific (e.g., related to measuring force in the line in the above example), and corresponding context data and metadata can be used to identify the specific smart objects 270. An iterative set of queries and responses can reveal smart objects 270 in smart object registry 230 which may be used for the domain specific objective.

In some embodiments, external system 200 can also access sensor fusion tool store 240 and populate sensor fusion tool store 240 with any proprietary or existing algorithms/fusion tools as needed. For example, if external system 200 desires a specific Kalman filter to be used for obtaining estimations on the force of the line, sensor fusion tool store 240 can be populated with related Kalman filter algorithms.

These queries and responses between the external system 200 and sensor fusion service 210 can lead to a determination or discovery of available smart objects 270. For example, a domain expert may determine, based on a priori knowledge of a specific bollard in a specific terminal in a port, whether the fender in the terminal may have pressure sensors, and what type of information such sensors may provide. With this knowledge, the external system 200 can determine what type of smart objects 270 may be desired for that bollard. In some embodiments, external system 200 may choose from available sensors and smart objects 270. For example, external system 200 may decide that information from the current, wind, and pressure sensors are to be fused and information on dimensions of the ship and number of bollards and lines are desired.

Sensor fusion request generator 250 in sensor fusion service 210 can receive the sensor fusion intent from API 220 and transform it into a technology-specific sensor fusion request, which it can send to sensor fusion manifest generator 260. The sensor fusion request is an intermediary data structure between the sensor fusion intent and the sensor fusion manifest. It can parse the sensor fusion intent and determine, among other things, what smart objects 270, corresponding to sensors in environment 100, will be used to fulfill the intent and what methods will be used to fuse the data. Sensor fusion request generator 250 will be discussed in more detail in the description of FIG. 3.

To achieve the mapping of a sensor fusion intent to a sensor fusion request, sensor fusion request generator 250 can use ontologies, natural language processing analytics, semantic mapping, or other means. It can request and receive data from smart object registry 230, sensor fusion tool store 240, and smart objects 270 to achieve the mapping. Smart object registry 230 can include information about smart objects 270, such as capabilities of the physical sensors, methods associated with the sensors, the operational status of sensors and their smart objects, (e.g., whether a smart object or an underlying sensor is currently deployed or active), or other factors. Sensor fusion tool store 240 can include algorithms or tools for fusing data, such as Kalman filter algorithms. Smart objects 270 can have open APIs accessible by sensor fusion request generator 250, and can provide direct information about themselves and their associated sensors.

In some embodiments, a sensor fusion request can include a set of smart objects 270 to be used in the sensor fusion; methods inherent to smart objects 270 which will be used for sensor fusion; methods inherent to smart objects 270 which will not be used for sensor fusion; algorithms, tools, or other parameters used to fuse the data from smart objects 270; the message broker to be used in communications; and an identifier for external system 200, the ultimate recipient of the fused data. The smart objects 270 included in the sensor fusion request will have at least a portion of their data used in the fusion process.

Sensor fusion manifest generator 260 can receive a sensor fusion request from sensor fusion request generator 250 and transform it into a sensor fusion manifest, which it can send to sensor fusion process 280. The sensor fusion manifest can be a deployable object which receives data from smart objects 270 and sends out fused data to external system 200 or another receiver. The sensor fusion manifest can contain everything listed in the sensor fusion request, including a set of smart objects 270 to be used in the sensor fusion; methods inherent to smart objects 270 which will be used for sensor fusion; methods inherent to smart objects 270 which will not be used for sensor fusion; algorithms, tools, or other parameters used to fuse the data from smart objects 270; the message broker to be used in communications; and an identifier for external system 200, the ultimate recipient of the fused data.

In some embodiments, the sensor fusion manifest can be an executable script, like the one shown here:

```
Create_SF_Manifest
Input (the SF request):
    SOs:                    SO=[SO₁,..., SOₙ]
    Methods for SF:         SF=[(SOᵢ,M(SOᵢ)),...,(SOₚ,M (SOₚ))]
    Methods Outside SF:                   OSF=[(SOⱼ,M'(SOⱼ)),...,(SOᵣ,M'(SOᵣ))]
    SF Parameters:          P={P₁, ..., Pₘ,SF_Algorithm(s),SF_tool(s)}   #
    e.g., labelled in an XML
    Message Broker:         MB           # e.g., MQTT
    External Analytics:                  EA_ID            # ID of the analytics
    that will consume the fused data
Output (SF service description in machine-readable format):
    MANIFEST                # SF service manifest
CREATE empty MANIFEST               # based on existing Templates
FOR each element in SO DO
    IF SO instance is not up and running THEN
        ADD SO instance deployment to MANIFEST
    IF SO in SF THEN
        SF_stream=Add_data_publisher_to_manifest(MB,DT,GET(M(SO)))
        ADD SF_stream to MANIFEST
    IF SO in OSF THEN
        OSF_stream=Add_data_publisher_to_manifest(MB,DT',GET(M'(SO)))
        ADD OSF_stream to MANIFEST
ADD SF_instance deployment to MANIFEST          #creates a basic runtime
environment for the SF process
ADD SF_ID=Get(SF_instance(ID)) to MANIFEST                    #adds getting the ID of
SF_instance to the manifest
Internal_SF_Subscriber=Add_data_subscriber_to_manifest(MB,||SF||,[DT]_{MB}
,[GET(M(SO))]_{SF},SF_ID)
ADD Internal_SF_Subscriber to MANIFEST          #subscribes to data
streams selected for the fusion
FOR each element in P DO
```

```
    ADD temporal config on Internal_SF_Subscriber to                # NTP,
        MANIFEST
measurement frequency, FPS
    ADD spatial config on Internal_SF_Subscsriber to MANIFEST        # PTZ
camera, no. measurement points,...
SF_output=Add_data_publisher_to_manifest(MB,DT_SF,
Output(SF_instance))
ADD SF_output to MANIFEST
External_SF_Subscriber=Add_data_subscriber_to_manifest(MB,1,DT_SF,Ou
tput(SF_instance),EA_ID)
ADD External_SF_Subscriber to MANIFEST
External_OSF_Subscriber=Add_data_subscriber_to_manifest(MB,||OSF||,[DT
']_{MB},[GET(M'(SO))]_{OSF},EA_ID)
ADD External_OSF_Subscriber to MANIFEST
RETURN MANIFEST
Add_data_publisher_to_manifest
Input:
    Message Broker:             B
    Data Topic:    T
    Data stream: D
Output:
    Manifest snippet:           MS
IF T does not exist in B THEN
    ADD creation of T in B to MS
ELSE
    ADD config Publisher=B(T(D)) to MS
RETURN MS
Add_data_subscriber_to_manifest
Input:
        Message Broker:             B
        Number of Topics:           N
        Data Topic Array:           [T]
        Data stream Array:          [D]
        Subscriber:     S_ID
Output:
        Manifest snippet:           MS
SET Subscriber=S_ID
FOR i=1 to N DO
        ADD config Subscriber=(Subscriber,B(T_i(D_i))) to MS
RETURN MS
```

In some embodiments, generating the sensor fusion manifest includes a process of creating an initial manifest based on existing templates, and then populating the manifest. For example, the initial manifest can include an available manifest from a tool like Puppet or a template based on a service model such as Yang. Starting with such an initial template can allow population of the manifest with a basic set of data and instructions for sensor fusion, for example, which may be popular or common to many types of sensor fusion. Starting from the initial template, smart objects 270 which may have existing instances or may be currently running can be added to the manifest. For example, instantiation and deployment of all smart objects 270 that may be referenced in the sensor fusion request can be included in the manifest. From this manifest, full or partial redundancies of smart objects 270, if any, can be determined. A subset of non-overlapping smart objects 270 and their respective data streams can then be obtained.

The sensor fusion manifest can include data publishers and subscribers, which are applications for sending and receiving messages (publications) associated with the smart objects 270 using the publish/subscribe method of messaging. Publishers and subscribers can be decoupled from one another so that publishers do not know the destination of the information that they send, and subscribers do not know the source of the information that they receive. The provider of the information is called the publisher, which supplies information about a smart object 270 without needing to know anything about the applications that are interested in the information. The consumer of the information is called a subscriber, which decides what information it is interested in, and then waits to receive that information. Subscribers can receive information from many different publishers, and the information they receive can also be sent to other subscribers.

In some embodiments, the data publishers associated with the smart objects can be used for sending data from their associated smart objects 270 to the message broker. For example, once a smart object 270 is instantiated and an algorithm for sensor fusion using smart object 270 is created, instructions can be provided in the sensor fusion manifest to the publisher to send the data from smart objects 270 to the message broker during runtime. The manifest can also include associated subscribers for performing data fusion on the data supplied by the publishers. In some embodiments, sensor fusion instances can be created in the manifest, and be associated with identifiers. For example, when the manifest is used in a sensor fusion deployment, the specific instances of sensor fusion can be referenced using the identifiers. For example, sensor fusion instances can be created using the publisher-subscriber model for the various smart objects, such as instances for force on the line info, data streams related to the wind, data streams about pressure on the fender, etc.

In some embodiments, sensor fusion manifest generator 260 can be used to create a runtime environment for the sensor fusion processes employed by sensor fusion process 280. The temporal and spatial requirements on the subscriber can be configured. In some embodiments, network time synchronization protocols may be adopted in the manifest. The manifest can include instructions for the frequency of certain measurements, such as a request for obtaining the force measurement on the line at periodic intervals (e.g., 25 milliseconds). Sensor fusion process 280 will be described in greater detail in the description of FIG. 4.

Figure 3:
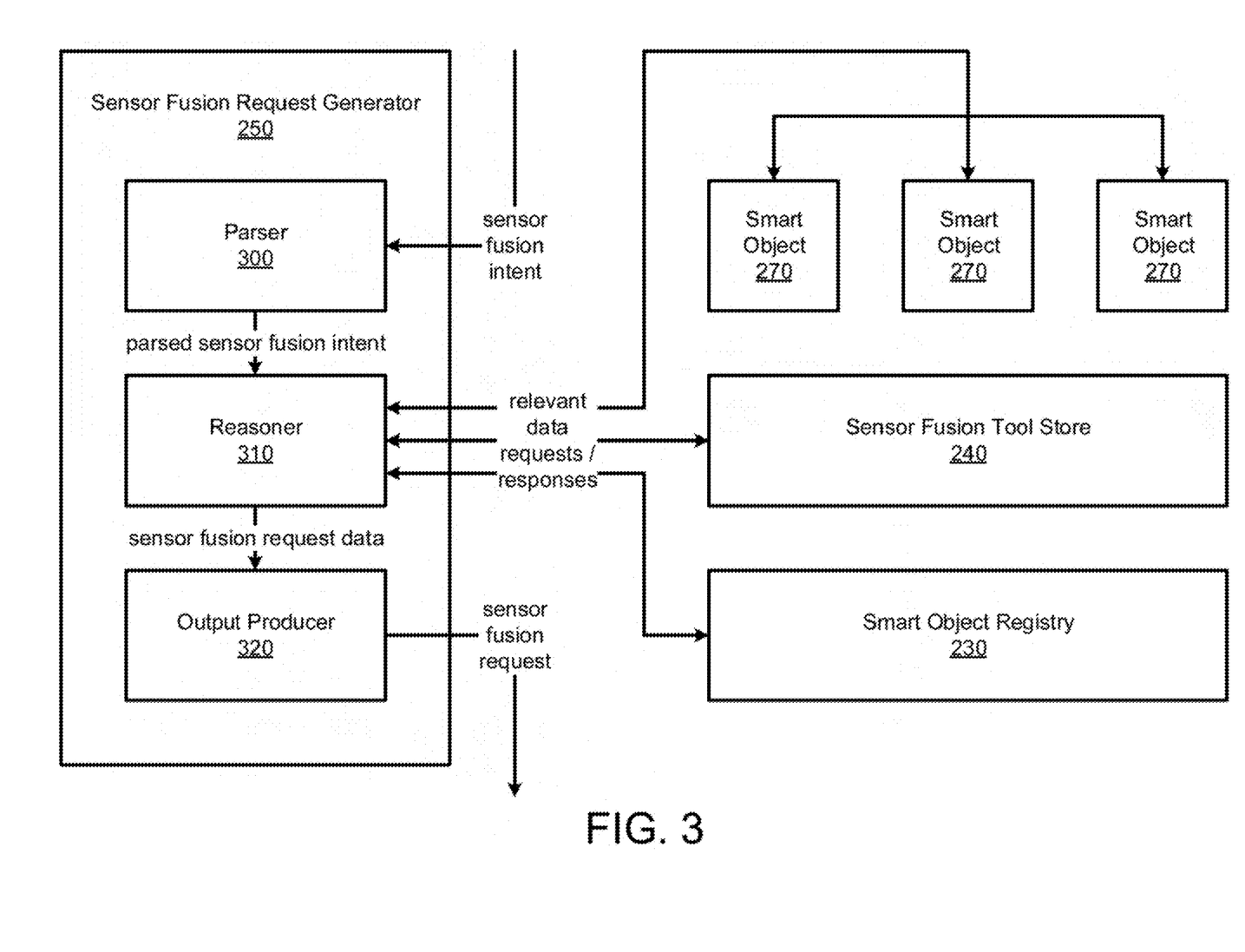
FIG. 3 illustrates a system diagram of an implementation of a mapping function used for sensor fusion, in accordance with some embodiments of the present technology.

Accordingly, the sensor fusion intent created using the domain specific knowledge can be used to generate the sensor fusion request, from which the sensor fusion manifest can be generated. The manifest can provide an automated process for the sensor fusion intent, and accordingly provide sensor fusion as a service.

objects 270 for measuring the force on the line, one or more smart objects 270 for measuring wind, one or more smart objects 270 for measuring current, etc. In some embodiments, a subset of these smart objects 270 may be fused while other smart objects 270 may be overlapping or redundant or may be used for other types of data like operational data.

Output producer 320 takes sensor fusion request data generated by reasoner 310 and bundles this data into a sensor fusion request. In some embodiments, a sensor fusion request can take the following form:

| | | |
|---|---|---|
| SOs: | $SO=[SO_1,..., SO_n]$ | |
| Methods for SF: | $SF=[(SO_i,M(SO_i)),...,(SO_p,M(SO_p))]$ | |
| Methods Outside SF: | $OSF=[(SO_j,M'(SO_j)),...,(SO_r,M'(SO_r))]$ | |
| SF Parameters: | $P=\{P_1, ..., P_m, SF\_Algorithm(s), SF\_tool(s)\}$ | # |
| e.g., labelled in an XML | | |
| Message Broker: | MB | # e.g., MQTT |
| External Analytics: | EA_ID | # ID of the analytics |
| that will consume the fused data | | |

Sensor fusion process 280 receives the sensor fusion manifest from sensor fusion manifest generator 260 and relevant sensor fusion algorithms or tools from sensor fusion tool store 240. Sensor fusion process 280 actually deploys the sensor fusion manifest and returns fused data to external system 200 or another receiver. In some embodiments, sensor fusion process 280 can be a remote computing system, such as a public cloud; in others, it can exist on the same network as external system 200 or sensor fusion service 210. Sensor fusion process 280 will be described in greater detail in FIG. 4.

FIG. 3 illustrates a system diagram of an implementation of a mapping function used for sensor fusion, in accordance with some embodiments of the present technology. Sensor fusion request generator 250 maps a sensor fusion intent into a sensor fusion request. Sensor fusion request generator 250 can include several components such as parser 300, reasoner 310, and output producer 320.

Parser 300 can obtain the sensor fusion intent from external system 200 via API 220 and parse the information in the sensor fusion intent to produce a format which is sent to reasoner 310. The sensor fusion intent can be in any number of formats, including XML, JSON, or other data structures understandable to parser 300.

Reasoner 310 can be configured as a link between smart object registry 230 and sensor fusion tool store 240. In some embodiments, one or more ontologies may be used in implementing the reasoner 310. In some embodiments, reasoner 310 can implement a technology agnostic methodology to use semantics of the sensor fusion intent to perform semantic mapping and synthesize the smart objects and tools which may be associated with the intent. For example, reasoner 310 can obtain a parsed sensor fusion intent and produce an output which is associated with a set of smart objects 270 that can be used in achieving the intent. In some embodiments, based on the intent a natural language processing (NLP) tool can be used for understanding which specific smart objects may be used for the sensor fusion intent which specific methods from sensor fusion tool store 240 may be used for the fusion. In some embodiments, one or multiple of these techniques may be used by reasoner 310.

For example, a number of smart objects 270 can be identified in the sensor fusion request data output by reasoner 310, including one or more smart objects 270 for measuring the pressure on the fender, one or more smart "SOs" lists a set of smart objects 270 to be used in the sensor fusion. "Methods for SF" lists methods inherent to smart objects 270 which will be used for sensor fusion, while "Methods Outside SF" lists methods inherent to smart objects 270 which will not be used for sensor fusion. "SF Parameters" indicates a list of algorithms, tools, or other parameters used to fuse the data from smart objects 270. "Message Broker" indicates the message broker to be used. "External Analytics" contains an identifier for external system 200, the ultimate recipient of the fused data.

In some embodiments, sensor fusion parameters in the sensor fusion request may be used in the sensor fusion manifest, which can be determined by reasoner 310 or in conjunction with the sensor fusion intent. In some embodiments, one or more different message brokers may be available to sensor fusion service 210 and reasoner 310 can select a message broker (e.g., Message Queuing Telemetry Transport) for creating the data feeds that will be fused for the desired sensor fusion. Reasoner 310 may also extract from the parsed sensor fusion intent information external to the sensor fusion process, such as the domain name of a specific port's IP address that may be mapped to a specific process within the external entity that will be the consumer of the data fused. Accordingly, in some embodiments, reasoner 310 may select the smart objects 270, specific methods for the fusion, specific methods for data that may be used in analytics external to fusion, specific parameters like angle, algorithms, tools, message broker, etc.

In some embodiments, based on the smart objects 270 selected by reasoner 310, an objective and corresponding methods for the sensor fusion can be determined. For example, parameters for adjustment and continuous assessment of space and time requirements and synchronization, of certain cameras (e.g., pan, tilt, zoom, adjustments or redirections of the cameras based on wind movement, etc.) can also be determined along with a sensor fusion process using the selected smart objects. Thus, if there are adjustments on the space and time characteristics to be considered for a particular sensor fusion process for analyzing tension or force on the line for a specific bollard, such adjustments can also be predicted or determined in advance. Thus, in the example of a particular berthing position and time for a ship, the synchronization of various elements such as currents, wind, etc., to be taken into account and can be specified in the manifest or model.

Figure 4:
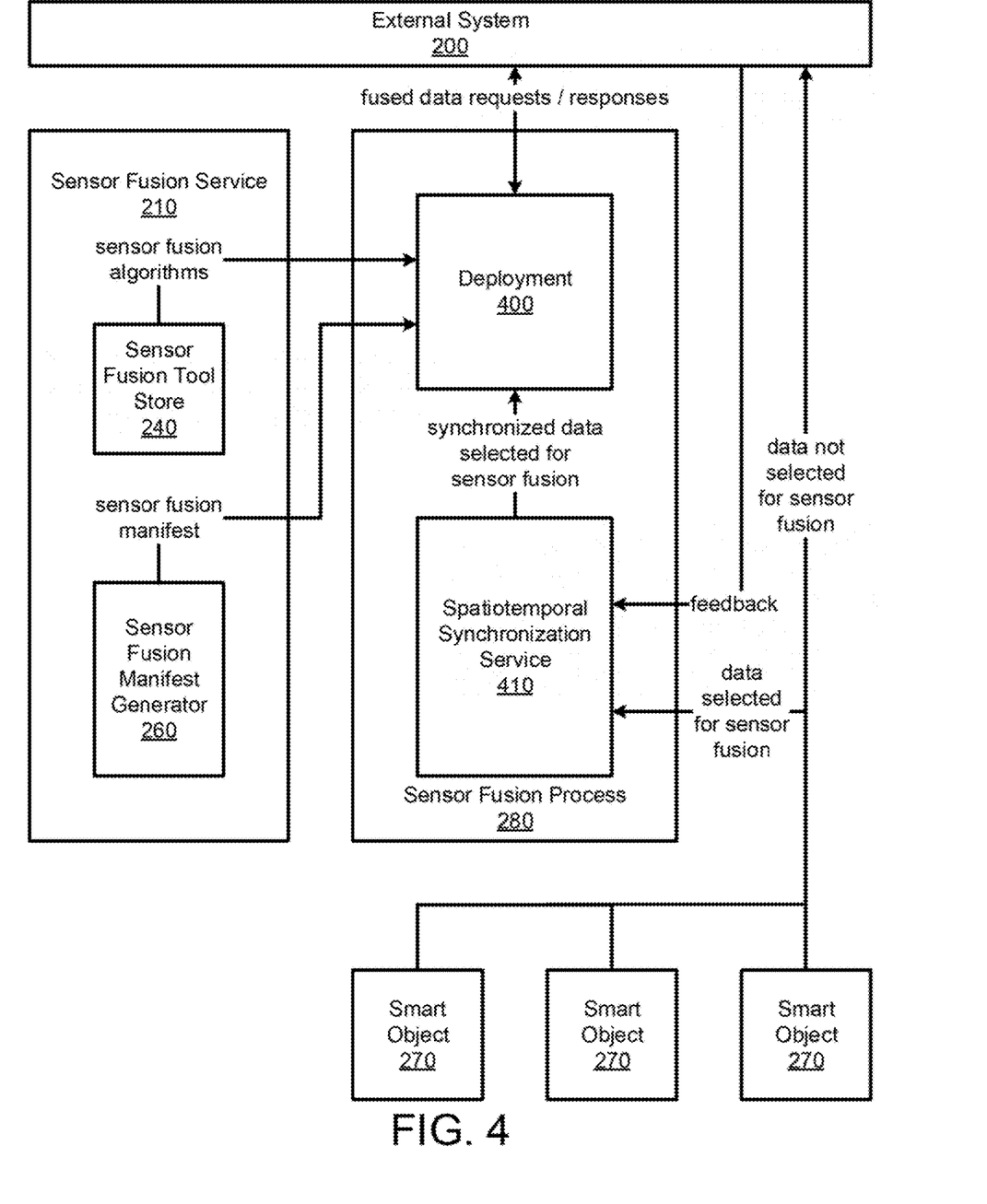
FIG. 4 illustrates a system diagram showing a logical view of a sensor fusion process, in accordance with some embodiments of the present technology.

FIG. 4 illustrates a system diagram showing a logical view of a sensor fusion process, in accordance with some embodiments. Sensor fusion process 280 can receive the sensor fusion manifest from sensor fusion manifest generator 260 in sensor fusion service 210 and deploy it. Sensor fusion process 280 can be operated by the same entity operating sensor fusion service 210, by external system 200, or by a third party.

Deployment 400 deploys the sensor fusion manifest received from sensor fusion service 210. For example, when the sensor fusion manifest is an executable script, deployment 400 executes the script. It can send fused data to external system 200 for consumption and analysis by external system 200. It can send the fused data as a continuous stream, or send it in response to specific requests received from external system 200.

Spatiotemporal synchronization service 410 is a closed loop function which can be configured for spatiotemporal synchronization. It receives data selected for sensor fusion from smart objects 270 and outputs a synchronized adjustment of that data. Spatiotemporal synchronization service 410 can be configured for real-time adjustments. For example, if some smart objects 270 show changes in battery status, camera tilt, zoom, etc. then appropriate adjustments to maintain spatiotemporal synchronicity may be needed. Smart objects 270 can send data not selected for sensor fusion to external system 200. This data, along with the fused data received from deployment 400, can be used by external system 200 to send synchronization feedback to spatiotemporal synchronization service 410.

Figure 5:
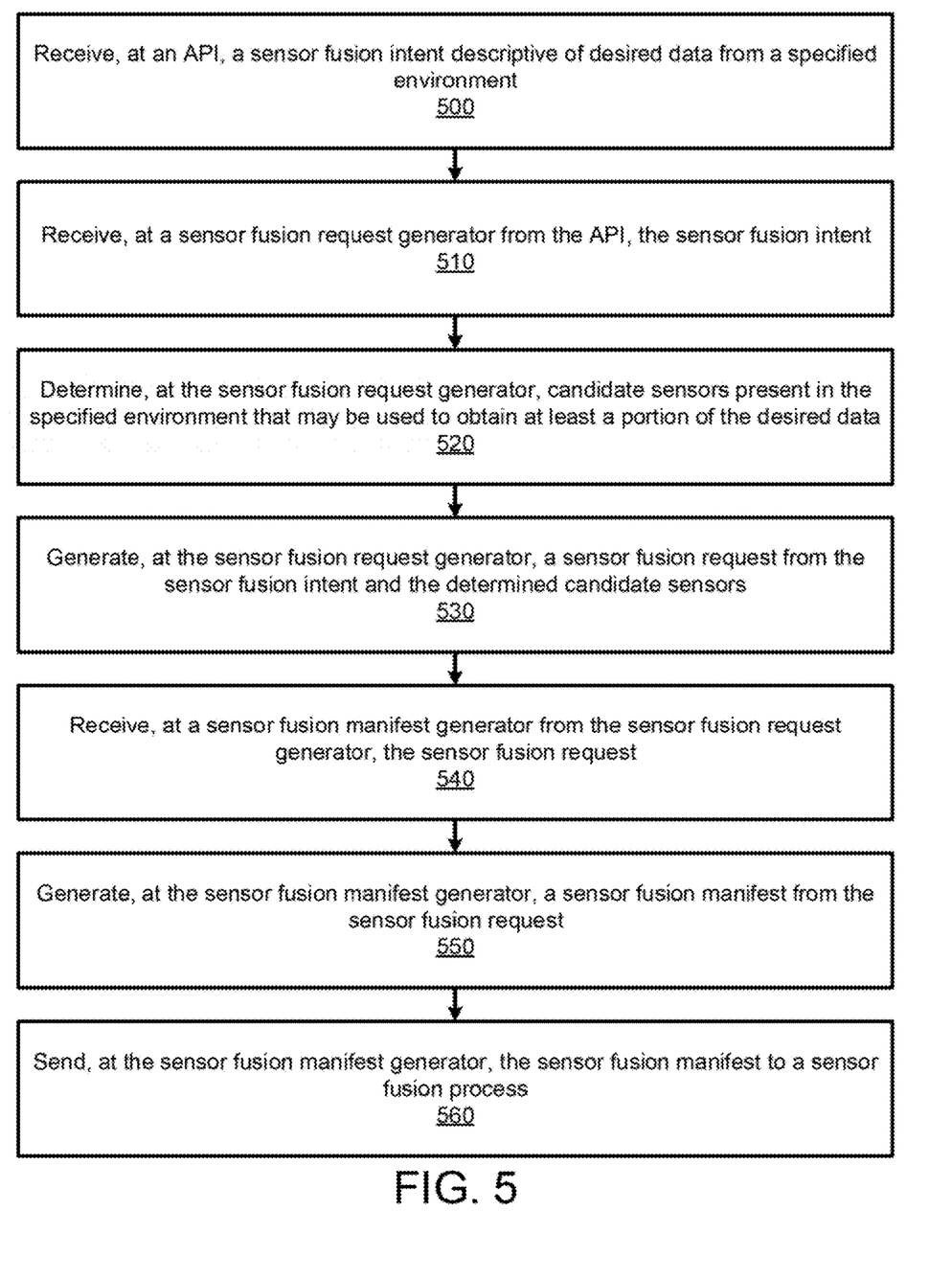
FIG. 5 illustrates an example method, in accordance with some embodiments of the present technology.

FIG. 5 illustrates an example method, in accordance with some embodiments of the present technology. Sensor fusion service 210 receives a sensor fusion intent through an API or other interface and transforms it into a sensor fusion manifest. The method described in FIG. 5 can be carried out by the systems described in FIGS. 2-4.

The method begins when API 220 in sensor fusion service 210 receives (500) a sensor fusion intent from external system 200. The sensor fusion intent describes desired data from a specified environment, such as the docking environment described in FIG. 1. The specified data may include data from certain sensors in an environment, or it may be technology-agnostic, merely desiring data regarding a measurement such as the force on a bollard, pressure on a quay wall, or another measurement.

Sensor fusion request generator 250 receives (510) the sensor fusion intent from API 220. Once it has the sensor fusion intent, sensor fusion request generator 250 can parse the intent and determine (520) candidate sensors present in the specified environment that may be used to obtain at least a portion of the desired data. In some embodiments, these candidate sensors have smart objects 270 as digital replicas of the sensors. Information about these smart objects 270 can be stored in a smart object registry 230. From the sensor fusion intent and the determined candidate sensors, sensor fusion request generator 250 generates (530) a sensor fusion request. The sensor fusion request is a technology-specific data object, specifying sensors, methods, algorithms, and tools for generating a sensor fusion manifest.

Sensor fusion manifest generator 260 receives (540) the sensor fusion request from sensor fusion request generator 250. The sensor fusion request has necessary information to create the sensor fusion manifest, which sensor fusion manifest generator 250 generates (550) from said information. Sensor fusion manifest generator 260 sends (560) the sensor fusion manifest to sensor fusion process 280, which ultimately deploys the sensor fusion manifest so that external system 200 can consume the fused data.

Figure 6:
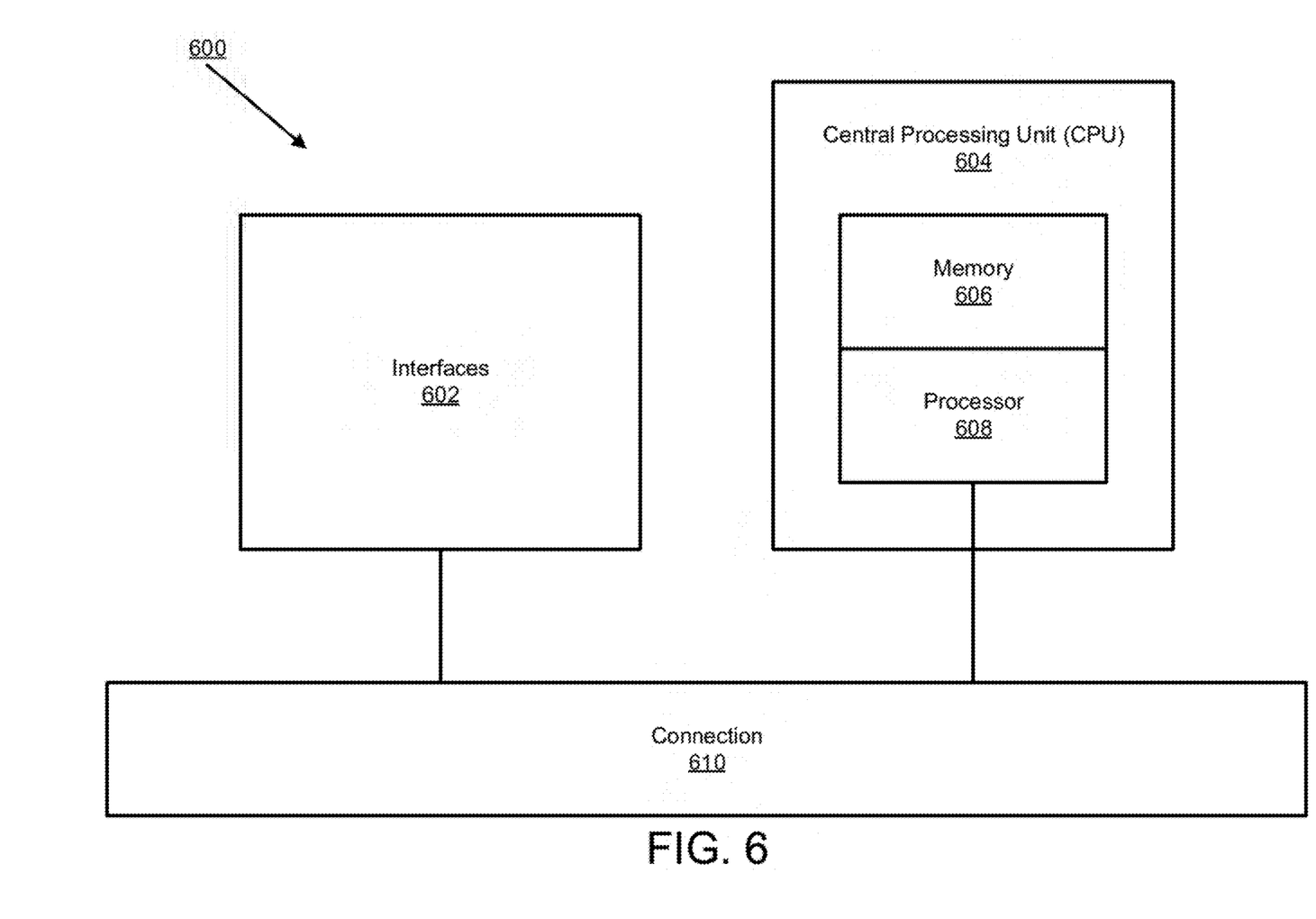
FIG. 6 illustrates an example network device, in accordance with some embodiments of the present technology.

FIG. 6 illustrates an example network device 600 suitable for implementing the aspects according to this disclosure. In some embodiments, the sensors, smart objects 270, or others discussed in example systems may be implemented according to the configuration of the network device 600. The network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. The CPU 604 may include one or more processors 608, such as a processor from the INTEL X86 family of microprocessors. In some cases, processor 608 can be specially designed hardware for controlling the operations of the network device 600. In some cases, a memory 606 (e.g., non-volatile RAM, ROM, etc.) also forms part of the CPU 604. However, there are many different ways in which memory could be coupled to the system.

Figure 7:
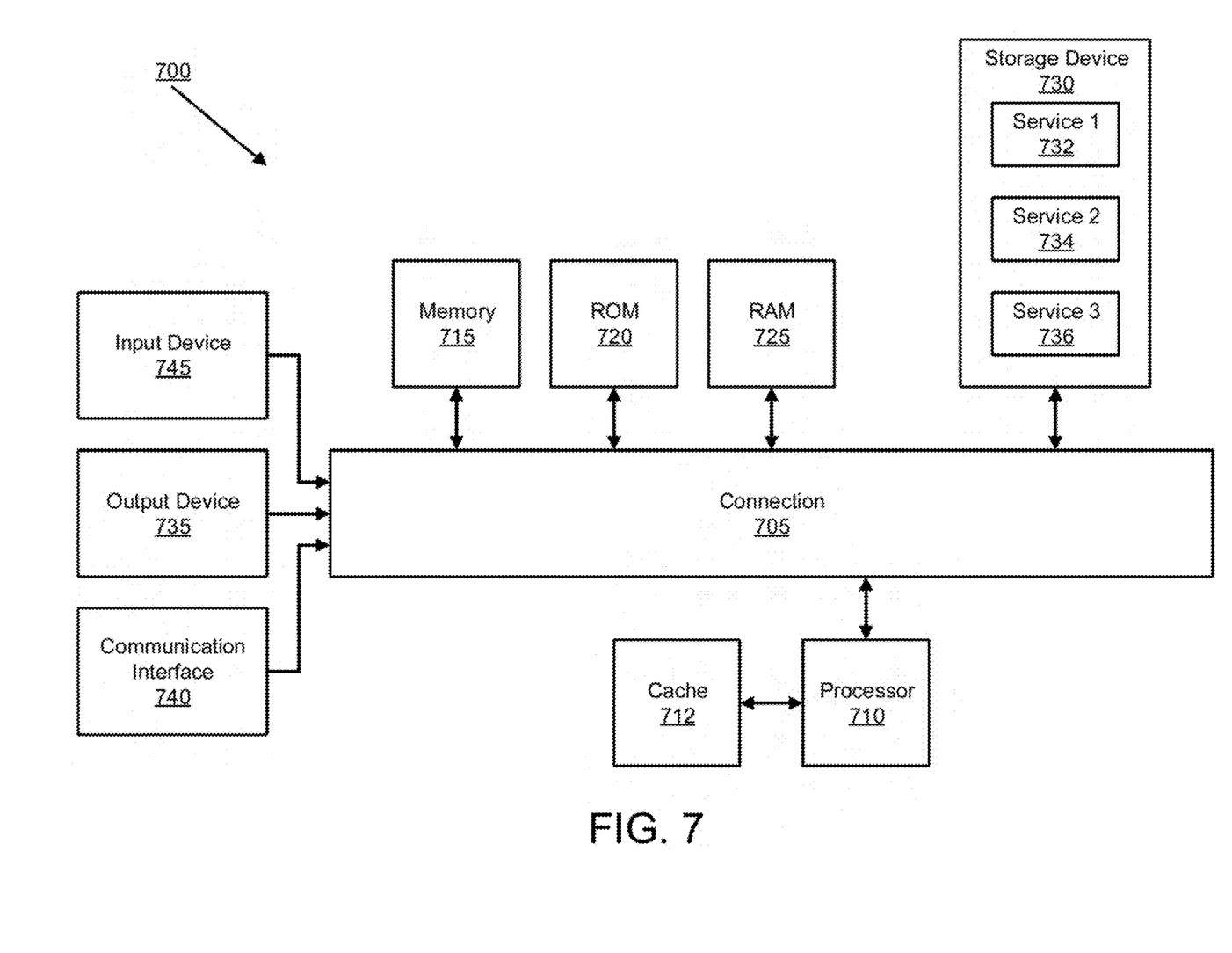
FIG. 7 illustrates an example computing device architecture, in accordance with some embodiments of the present technology.

The interfaces 602 are typically provided as modular interface cards (sometimes referred to as "line cards"). Generally, they control the sending and receiving of data packets over the network and sometimes support other peripherals used with the computing device architecture 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 604 to efficiently perform routing computations, network diagnostics, security functions, etc.

Although the system shown in FIG. 6 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the connection 610, to exchange data and signals and coordinate various types of operations by the network device 600, such as routing, switching, and/or data storage operations, for example.

FIG. 7 illustrates an example computing device architecture 700 of an example computing device which can implement the various techniques described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some embodiments of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   receiving, from a domain expert having a specialized knowledge of a context associated with desired data, a sensor fusion intent descriptive of the desired data from one or more sensors in a specified environment for fusion across the one or more sensors to generate the desired data;
   determining candidate sensors present in the specified environment that may be used to obtain at least a portion of the desired data, the candidate sensors being determined by analyzing the sensor fusion intent using one or more of semantic mapping, ontologies, or natural language processing to extract information to identify the candidate sensors from a registry of smart objects, the registry of smart objects identifying the candidate sensors and their associated functions, the smart objects being digital replicas of the candidate sensors in the specified environment; and
   transforming the sensor fusion intent into a sensor fusion manifest by selecting a plurality of the candidate sensors to obtain respective output data, and by defining at least one action to fuse the respective output data into the desired data, wherein the sensor fusion manifest includes an identification of the selected candidate sensors and the at least one action to fuse the respective output data from the selected candidate sensors into the desired data and the selected candidate sensors are implemented as nodes in a network environment to provide data fusion across at least a portion of the network environment.

2. The method of claim 1, wherein sensor fusion algorithms available for fusing data are cataloged in a sensor fusion tool store storing a plurality of algorithms available to fuse data received from a combination of sensors, wherein the defining at least one action to fuse the respective output data into the desired data comprises:
   determining at least one algorithm to fuse the respective output data into the desired data from the sensor fusion tool store.

3. The method of claim 1, wherein the sensor fusion intent includes a spatial requirement, a temporal requirement, a spatiotemporal requirement, or a domain type.

4. The method of claim 1 comprising:
   sending the sensor fusion manifest to be carried out on a remote computing system.

5. The method of claim 1, comprising:
   after receiving the sensor fusion intent, analyzing the sensor fusion intent using semantic mapping, ontologies, or natural language processing to extract information used to identify at least one algorithm from a sensor fusion tool store storing a plurality of algorithms available to fuse data received from a combination of sensors.

6. The method of claim 1, wherein the manifest further includes spatial, temporal, or spatial temporal relationships between where and when the output data is to be retrieved and fused.

7. The method of claim 1 further comprising performing a closed loop adjustment of the sensors associated with the smart objects based on analyzing the sensor fusion manifest under deployment.

8. The method of claim 4, wherein the smart objects comprise an application programmable interface (API) for receiving requests for data from the remote computing system.

9. A sensor fusion system comprising:
   a smart object registry configured to store a definition of a plurality of smart objects, the smart objects being digital replicas of a plurality of sensors in a particular environment, the definition of the smart objects including data available from at least one of a sensor and a method inherent to the sensor;
   a sensor fusion tool store configured to store a plurality of algorithms available to fuse data received from a combination of sensors; and
   at least one processor configured to:
      receive, from a domain expert having a specialized knowledge of a context associated with desired data, a sensor fusion intent descriptive of the desired data from one or more sensors in a specified environment for fusion across the certain sensors to generate the desired data;
      determine candidate sensors present in the specified environment that may be used to obtain at least a portion of the desired data, the candidate sensors being determined by analyzing the sensor fusion intent using one or more of semantic mapping, ontologies, or natural language processing to extract information to identify the candidate sensors from the smart object registry; and
      transform the sensor fusion intent into a sensor fusion manifest by selecting a plurality of the candidate sensors to obtain respective output data, and by defining at least one action to fuse the respective output data into the desired data, wherein the sensor fusion manifest includes an identification of the selected candidate sensors and the at least one action to fuse the respective output data from the selected candidate sensors into the desired data and the selected candidate sensors are implemented as nodes in a network environment to provide data fusion across at least a portion of the network environment.

10. The system of claim 9, wherein the at least one processor configured to define the at least one action to fuse the respective output data into the desired data is configured to:
    determine at least one algorithm to fuse the respective output data into the desired data from the sensor fusion tool store.

11. The system of claim 9, wherein the sensor fusion intent includes a spatial requirement, a temporal requirement, a spatiotemporal requirement, or a domain type.

12. The system of claim 9, wherein the at least one processor is further configured to:
    send the sensor fusion manifest to be carried out on a remote computing system.

13. The system of claim 9, wherein the at least one processor is further configured to:
    after receiving the sensor fusion intent, analyze the sensor fusion intent using semantic mapping, ontologies, or natural language processing to extract information used to identify at least one algorithm from the sensor fusion tool store.

14. The system of claim 9, wherein the manifest further includes spatial, temporal, or spatial temporal relationships between where and when the output data is to be retrieved and fused.

15. The system of claim 9, wherein the at least one processor is further configured to perform a closed loop adjustment of the sensors associated with the smart objects based on analyzing the sensor fusion manifest under deployment.

16. The system of claim 12, wherein the smart objects comprise an application programmable interface (API) for receiving requests for data from the remote computing system.

* * * * *